(12) United States Patent
Watanabe (10) Patent No.: US 8,050,365 B2
(45) Date of Patent: Nov. 1, 2011

(54) RADIO COMMUNICATION DEVICE

(75) Inventor: Katsumi Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 11/958,161

(22) Filed: Dec. 17, 2007

(65) Prior Publication Data

US 2008/0152050 A1 Jun. 26, 2008

(30) Foreign Application Priority Data

Dec. 20, 2006 (JP) ................. P2006-342030

(51) Int. Cl.
*H04L 27/06* (2006.01)
(52) U.S. Cl. ........ 375/344; 341/108; 341/158; 341/143; 341/155; 341/166; 375/340; 375/316; 375/327; 375/347
(58) Field of Classification Search .......... 341/108, 341/158, 143, 155, 159, 166; 375/340, 316, 375/344, 324, 147, 136
See application file for complete search history.

(56) References Cited

U.S. PATENT DOCUMENTS

| | | | | |
|---|---|---|---|---|
| 4,888,557 A | * | 12/1989 | Puckette et al. | 329/341 |
| 5,504,455 A | * | 4/1996 | Inkol | 329/304 |
| 5,640,698 A | * | 6/1997 | Shen et al. | 455/323 |
| 6,337,885 B1 | | 1/2002 | Hellberg | |
| 6,600,438 B2 | * | 7/2003 | Hilton | 341/155 |
| 6,700,519 B2 | * | 3/2004 | Yamamoto | 341/143 |
| 7,477,706 B2 | | 1/2009 | Troemel | |
| 2002/0037060 A1 | * | 3/2002 | Kishi | 375/345 |
| 2002/0130798 A1 | * | 9/2002 | Tonami | 341/118 |

FOREIGN PATENT DOCUMENTS

| | | |
|---|---|---|
| CN | 1513226 A | 7/2004 |
| JP | 09-74364 | 3/1997 |
| JP | 2002-503912 | 2/2002 |
| JP | 2002-76975 | 3/2002 |
| JP | 2004-96177 | 3/2004 |
| JP | 2006-246059 | 9/2006 |

OTHER PUBLICATIONS

Jan-Erik Eklund et al., "A Multiple Sampling, Single A/D Conversion Technique for I/Q Demodulation in CMOS", IEEE Journal of Solid-State Circuits, vol. 31, No. 12, Dec. 1996.
Office Action dated Sep. 2, 2010 in corresponding Chinese Patent Application No. 200710301617.7 (12 pages).

* cited by examiner

*Primary Examiner* — Dac Ha
*Assistant Examiner* — Rahel Guarino
(74) *Attorney, Agent, or Firm* — Finnegan, Henderson, Farabow, Garrett & Dunner, L.L.P.

(57) ABSTRACT

A radio communication device performs baseband processing by subjecting a received signal to an AD conversion at a predetermined sampling frequency and converting a digital signal resulting from the AD conversion into a baseband signal by frequency conversion. The device includes a frequency converting unit configured to convert the resulting digital signal into a complex baseband signal. The device further includes a waveform shaping unit configured to subject the baseband signal to waveform shaping, and a down-sampling unit configured to subject the baseband signal to sample discrete reduction.

4 Claims, 11 Drawing Sheets

COEFFICIENTS OF EVEN-NUMBER COMPONENT

$\cos(2\pi n/4) = 1, 0, -1, 0, 1, 0, -1, 0, \cdots \quad (n=0, 1, 2, \ldots, \infty)$
$\sin(2\pi n/4) = 0, -1, 0, 1, 0, -1, 0, 1, \cdots \quad (n=0, 1, 2, \ldots, \infty)$

RADIO COMMUNICATION DEVICE

CROSS REFERENCES TO RELATED APPLICATIONS

The present invention contains subject matter related to Japanese Patent Application JP 2006-342030 filed in the Japan Patent Office on Dec. 20, 2006, the entire contents of which being incorporated herein by reference.

BACKGROUND OF THE INVENTION

1. Field of the Invention

The present invention relates to a radio communication device that down-converts a received signal into a baseband signal, and particularly to a radio communication device that down-converts a digital signal resulting from AD conversion at a predetermined sampling frequency into a baseband signal.

More specifically, the present invention relates to a radio communication device in which the circuit configuration of a frequency converter is simplified by utilizing a fact that a frequency ratio between a sampling frequency at which an analog signal in an IF band is subjected to AD conversion and a frequency when frequency conversion of the IF signal into a baseband signal is performed has a specific relation, and particularly to a radio communication device in which the circuit configuration of a frequency converter is simplified and an amount of operation in a stage succeeding the frequency converter is reduced.

2. Description of the Related Art

Radio communications play a wide variety of roles ranging from high-capacity basic trunk lines of terrestrial broadcasting, terrestrial microwave communications, satellite communications, satellite broadcasting and the like to access lines of mobile communications and the like. Digital radio communications that communicate digital data by radio, such as digital broadcasting, wireless LANs (Local Area Networks) and the like, have recently been a trend of the times.

In a digital radio communication, the encoding of an information source and a communication channel and the digital modulation of a transmission signal are performed on a sender side, and as opposed to the sender side, digital demodulation and the decoding of the information source and the communication channel are performed on a receiver side. The communication technology of a digital system can increase communication speed and capacity, and enhance resistances to noise, interference, and distortion, so that high quality can be achieved.

Figure 6:
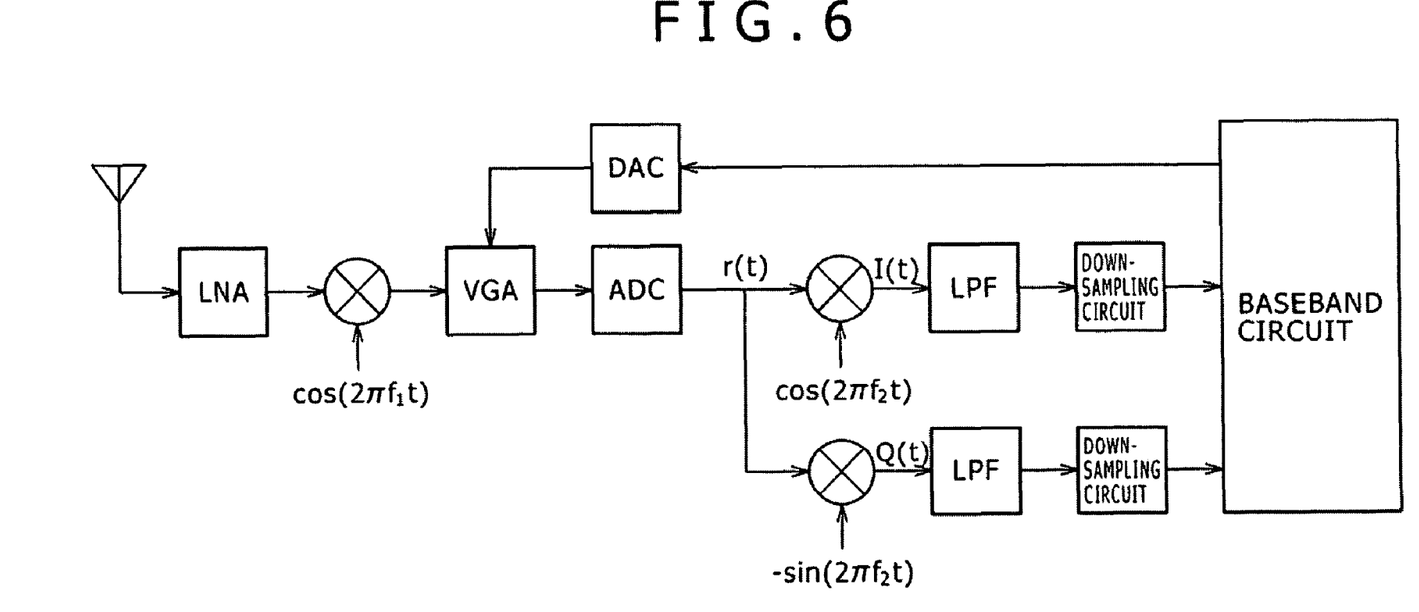
FIG. 6 is a diagram showing an example of configuration of a receiver for digital radio communication in related art.

FIG. 6 shows an example of configuration of a receiver for digital radio communication. First, an RF signal received by an antenna is amplified by an LNA (Low Noise Amplifier), and once down-converted from an RF band to a predetermined IF (Intermediate Frequency) band. Next, the IF signal is amplified by a VGA (Variable Gain Amplifier). The variable gain of the VGA is specified by a baseband circuit in a subsequent stage, and input to the VGA after being subjected to analog conversion by a DA converter (DAC). Next, an AD converter (ADC) converts the IF signal into a digital signal by an AD conversion at a predetermined sampling frequency. Further, the digital signal is down-converted into complex baseband signals by digital down-converters, subjected to waveform shaping by LPFs (Low Pass Filters), and down-sampled by down-sampling circuits. Thereafter the baseband circuit formed by a digital circuit performs baseband processing.

It is known in the art that the configuration of a frequency converter can be simplified when a relation such that a ratio of the sampling frequency at the time of the AD conversion to the frequency for subjecting the digital signal after the AD conversion to the frequency conversion is 4 to 1 or 4 to 3 holds (see for example, Coauthored by Jan-Erik Eklund and Ragnar Arvidsson "A Multiple Sampling, Single A/D Conversion Technique for I/Q Demodulation in CMOS" (IEEE Journal of Solid-State Circuits, Vol. 31, No. 12, December 1996)).

In the receiver shown in FIG. 6, a digital signal obtained by performing frequency conversion of an RF signal into an IF band in a first frequency converter (frequency $f_1$) and thereafter sampling the IF signal by AD conversion at a sampling frequency $F_s$ is subjected to frequency conversion in a second frequency converter (frequency $f_2$) to be converted into complex baseband signals. The complex baseband signals are then subjected to waveform shaping in the LPFs.

Figure 7:
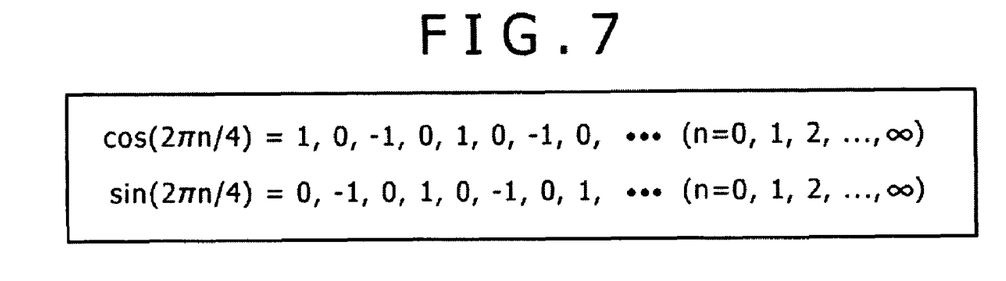
FIG. 7 is a diagram showing frequency conversion coefficients for replacing cosine and sine operations.

The second frequency conversion is as shown in the following Equations (1) and (2). In this case, time is treated as discrete times $\Delta t \times n$ ($n=0, 1, 2, \ldots, \infty$), $\Delta t = 1/F_s$, and $f_2/F_s = 1/4$. Cosine and sine operations in this case are performed in units of 90 degrees. Results of the cosine and sine operations therefore assume three values 0, 1, and −1. That is, multiplication of cosine and sine waveforms is not necessary, and cosines and sines can be treated as frequency conversion coefficients as shown in FIG. 7. Thus, zero and a sign inversion are used for the multiplication of the received signal r(t) after the AD conversion by a cosine and a sine, so that an amount of operation is greatly reduced (see Japanese Patent Laid-Open No. 2002-76975, paragraphs 0015 and 0016, for example).

$$I(t) = r(t) \cdot \cos(2 \cdot \pi \cdot f2 \cdot \Delta t \cdot n) = r(t) \cdot \cos\left(2 \cdot \pi \cdot \frac{n}{4}\right) \quad (1)$$

$$Q(t) = -r(t) \cdot \sin(2 \cdot \pi \cdot f2 \cdot \Delta t \cdot n) = -r(t) \cdot \sin\left(2 \cdot \pi \cdot \frac{n}{4}\right) \quad (2)$$

Figure 8:
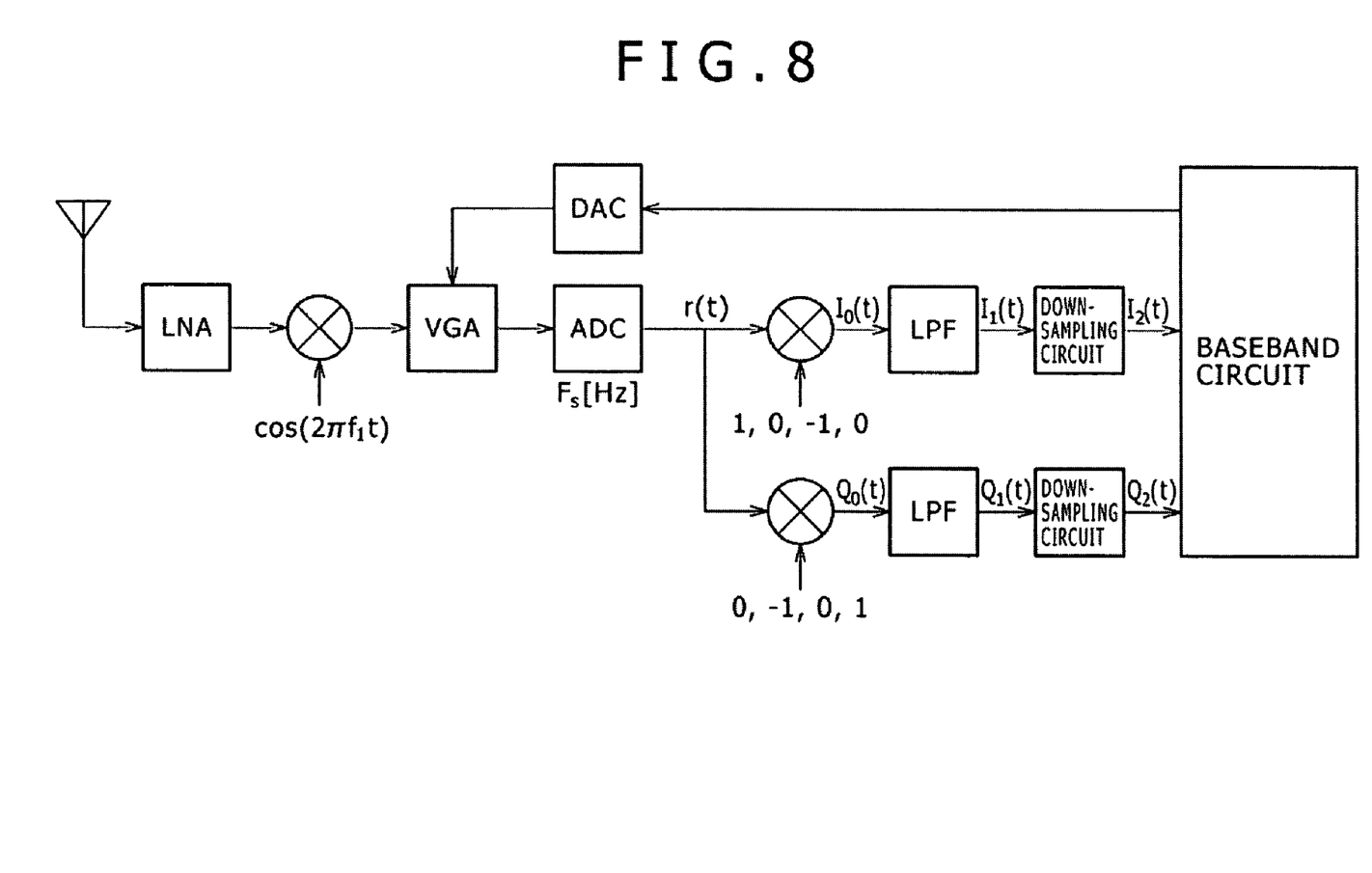
FIG. 8 is a diagram showing a configuration of a receiver whose circuit configuration is simplified by representing the multiplication of a received signal r(t) resulting from an AD conversion by a cosine and a sine by zero and a sign inversion.

FIG. 8 shows a configuration of a receiver whose circuit configuration is simplified by representing the multiplication of the received signal r(t) resulting from the AD conversion by the cosine and the sine by zero and a sign inversion. The receiver is the same as in FIG. 6 in that an RF signal received by an antenna is amplified by an LNA and then converted into an IF band by a frequency conversion by a first frequency converter (frequency $f_1$), and next the IF signal is amplified by a VGA and converted into a digital signal by an AD conversion at a sampling frequency F, by an AD converter. In a second frequency converter, the multiplication of the received signal r(t) after the AD conversion by the cosine and the sine with the frequency $f_2$ is replaced with the multiplication of the received signal r(t) after the AD conversion by the frequency conversion coefficients shown in FIG. 7.

Figure 9A:
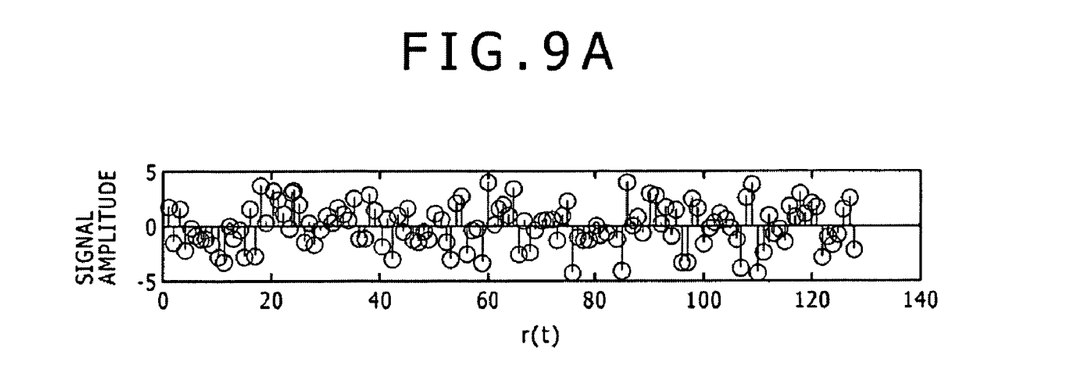
FIG. 9A is a diagram showing a state of the received signal r(t) after the AD conversion in the receiver shown in FIG. 8.
Figure 9B:
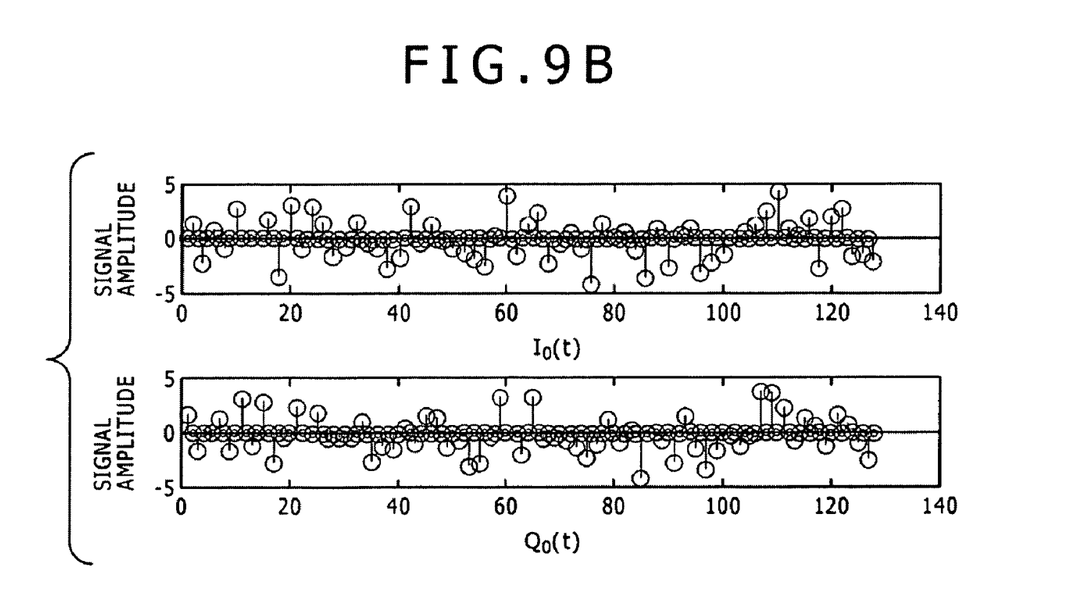
FIG. 9B is a diagram showing a state of complex baseband signals $I_0(t)$ and $Q_0(t)$ after frequency conversion of the received signal r(t) is performed using frequency conversion coefficients in the receiver shown in FIG. 8.
Figure 9C:
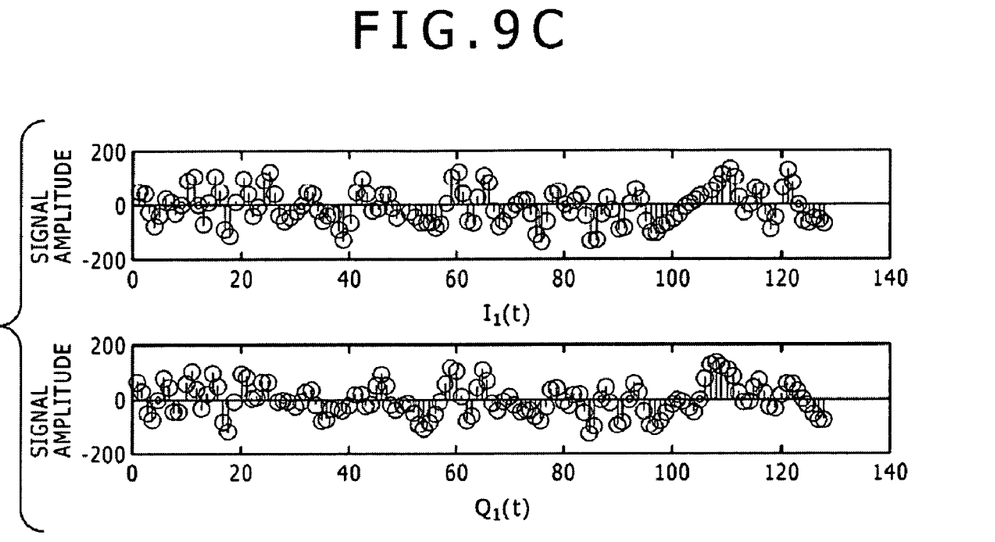
FIG. 9C is a diagram showing a state of complex baseband signals $I_1(t)$ and $Q_1(t)$ after waveform shaping is performed by LPFs in the receiver shown in FIG. 8.
Figure 9D:
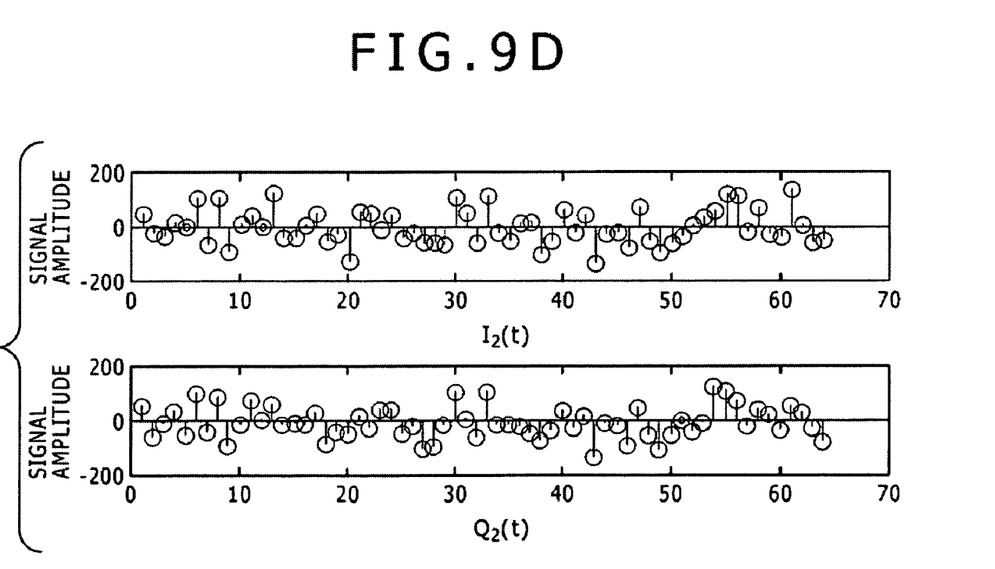
FIG. 9D is a diagram showing a state of complex baseband signals $I_2(t)$ and $Q_2(t)$ after down-sampling is performed in the receiver shown in FIG. 8.

FIGS. 9A to 9D show states of signals at respective points in the receiver shown in FIG. 8.

r(t) denotes a received signal resulting from AD conversion at the sampling frequency $F_s$. $I_0(t)$ and $Q_0(t)$ denote signals down-converted at the frequency $f_2$ by the frequency conversion coefficients shown in FIG. 7. FIG. 9B shows that the signals $I_0(t)$ and $Q_0(t)$ include zero in every other sample. This is due to zero alternately included in the frequency conversion coefficients.

Figure 10:
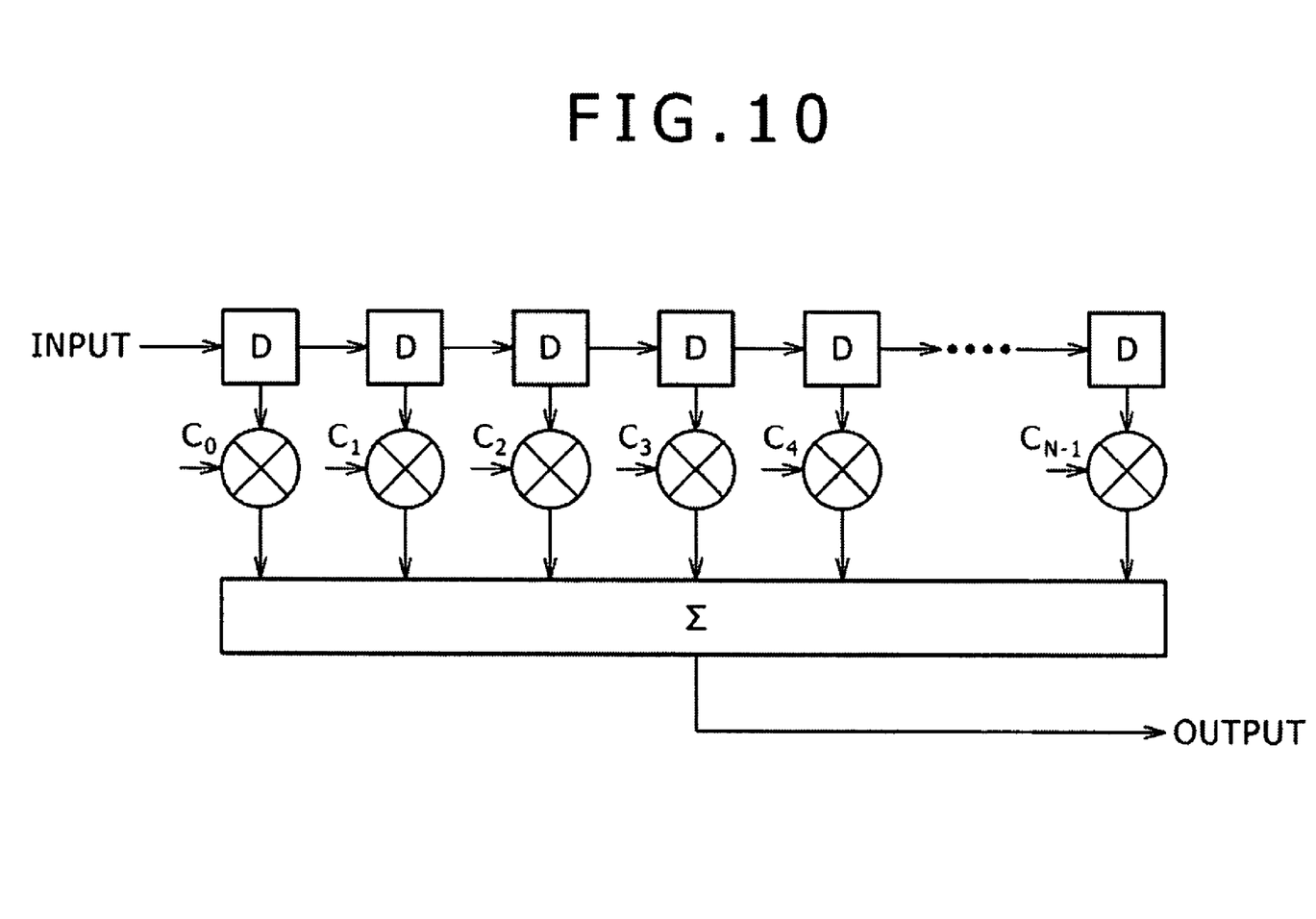
FIG. 10 is a diagram showing an example of configuration of a digital LPF in related art.

$I_1(t)$ and $Q_1(t)$ denote signals obtained by performing LPF processing on the frequency-converted signals $I_0(t)$ and $Q_0(t)$. FIG. 10 shows an example of configuration of a digital LPF.

$I_2(t)$ and $Q_2(t)$ denote results obtained by performing discrete reduction processing on the signals $I_1(t)$ and $Q_1(t)$ after the LPF processing by down-sampling circuits. In the example shown in FIG. 9D, discrete reduction is performed in every other sample, and thereby a rate is halved.

SUMMARY OF THE INVENTION

It is desirable to provide an excellent radio communication device that can favorably down-convert a digital signal resulting from AD conversion at a predetermined sampling frequency into a baseband signal.

It is also desirable to provide an excellent radio communication device in which the circuit configuration of a frequency converter is simplified by utilizing a fact that a frequency ratio between a sampling frequency at which an analog signal in an IF band is subjected to AD conversion and a frequency when frequency conversion of the IF signal into a baseband signal is performed has a specific relation.

According to an embodiment of the present invention, there is provided a radio communication device for performing baseband processing by subjecting a received signal to an AD conversion at a predetermined sampling frequency and converting a digital signal resulting from the AD conversion into a baseband signal by frequency conversion, the radio communication device including: a frequency converting unit for converting the digital signal resulting from the AD conversion into a complex baseband signal at a frequency $f_2$ having a relation such that a ratio of the sampling frequency $F_s$ at a time of the AD conversion to the frequency $f_2$ is one of a ratio of 4 to 1 and a ratio of 4 to 3; a waveform shaping unit for subjecting the baseband signal to waveform shaping; and a down-sampling unit for subjecting the baseband signal to sample discrete reduction taking one sample in N' (=N/2) samples, using a relation such that a ratio of a band occupied by the baseband signal to the sampling frequency $F_s$ is 1 to N (N is an even number of two or more).

Digital radio communication technology has recently spread widely. It is known that the configuration of a frequency converter can be simplified in a case where, in down-converting an IF signal after AD conversion into a baseband signal, a relation such that a ratio of a sampling frequency at the time of the AD conversion to a frequency for subjecting the digital signal after the AD conversion to the frequency conversion is 4 to 1 or 4 to 3 holds.

The present invention further proposes a system for simplifying the configuration of a receiver using a relation such that a ratio of a band occupied by a baseband signal to a sampling frequency is 1 to N (N is an even number of two or more).

Using a fact that a relation such that the ratio of the sampling frequency $F_s$ at which an analog signal in an IF band is subjected to the AD conversion to the frequency $f_2$ when the frequency conversion of the IF signal into the baseband signal is performed is 4 to 1 or 4 to 3 holds, the radio communication device according to the embodiment of the present invention can alternately allocate each sample of the signal after the AD conversion to an I-channel and a Q-channel, and the frequency converting unit can convert the digital signal resulting from the AD conversion into the baseband signal by sequentially multiplying each sample of the allocated samples by coefficients of 1 and −1 in each of the I-channel and the Q-channel.

The waveform shaping unit can subject the baseband signal in the I-channel to a filtering process using a filter including coefficients of an even-number component of an LPF, and subject the baseband signal in the Q-channel to a filtering process using a filter having coefficients of an odd-number component of the LPF. Because the filter coefficients are divided into even-numbered coefficients and odd-numbered coefficients, a circuit scale is halved as compared with a filter having all the coefficients.

When a relation such that the ratio of the sampling frequency $F_s$ of the AD conversion to the frequency $f_2$ when the frequency conversion of the IF signal into the baseband signal is performed is 4 to 1 or 4 to 3 holds, respective signals in the I-channel and the Q-channel after the frequency conversion alternately include zero, and thus not all the coefficients of the LPF are required for the waveform shaping of the signals in the respective channels. Accordingly, directing attention to the alternate insertion of zero in the signals after the frequency conversion, an amount of operation is reduced by omitting operation for filter coefficients to which zero is input.

The radio communication device according to the embodiment of the present invention may generate each of a digital signal in an I-channel and a digital signal in a Q-channel from the received signal by sampling using two AD converters that operate at an operating frequency of $F_s/2$ and in opposite phase from each other. In this case, while the number of AD converters included in the radio communication device is increased, the operating frequency of the AD converters is halved. Hence, the configuration is very effective in a system of an increased rate from a viewpoint of easing specifications imposed on the AD converters.

According to an embodiment of the present invention, it is possible to provide an excellent radio communication device that can favorably down-convert a digital signal resulting from AD conversion at a predetermined sampling frequency into a baseband signal.

In addition, according to an embodiment of the present invention, it is possible to provide an excellent radio communication device in which the circuit configuration of a frequency converter is simplified by utilizing a fact that a frequency ratio between a sampling frequency at which an analog signal in an IF band is subjected to AD conversion and a frequency when frequency conversion of the IF signal into a baseband signal is performed has a specific relation.

In addition, according to an embodiment of the present invention, it is possible to provide an excellent radio communication device n which the circuit configuration of a frequency converter is simplified and an amount of operation in a stage succeeding the frequency converter is reduced.

In the radio communication device according to the embodiment of the present invention, the circuit configuration of a frequency converter is simplified by utilizing a relation such that a frequency ratio between a sampling frequency at which an analog signal in an IF band is subjected to AD conversion and a frequency when frequency conversion of the IF signal into a baseband signal is performed is 4 to 1 or 4 to 3, and directing attention to processing in a stage succeeding the simplified frequency converter, an amount of operation can be reduced by utilizing a relation such that a ratio of a band occupied by the baseband signal to the sampling frequency is 1:N (N is an even number of two or more).

In addition, according to an embodiment of the present invention, the operating frequency of AD converters can be halved, and thus design specifications are eased.

Other and further features and advantages of the present invention will become apparent from more detailed description on the basis of embodiments of the present invention to be described later and the accompanying drawings.

DETAILED DESCRIPTION OF THE PREFERRED EMBODIMENTS

Preferred embodiments of the present invention will hereinafter be explained in detail with reference to the drawings.

Figure 1:
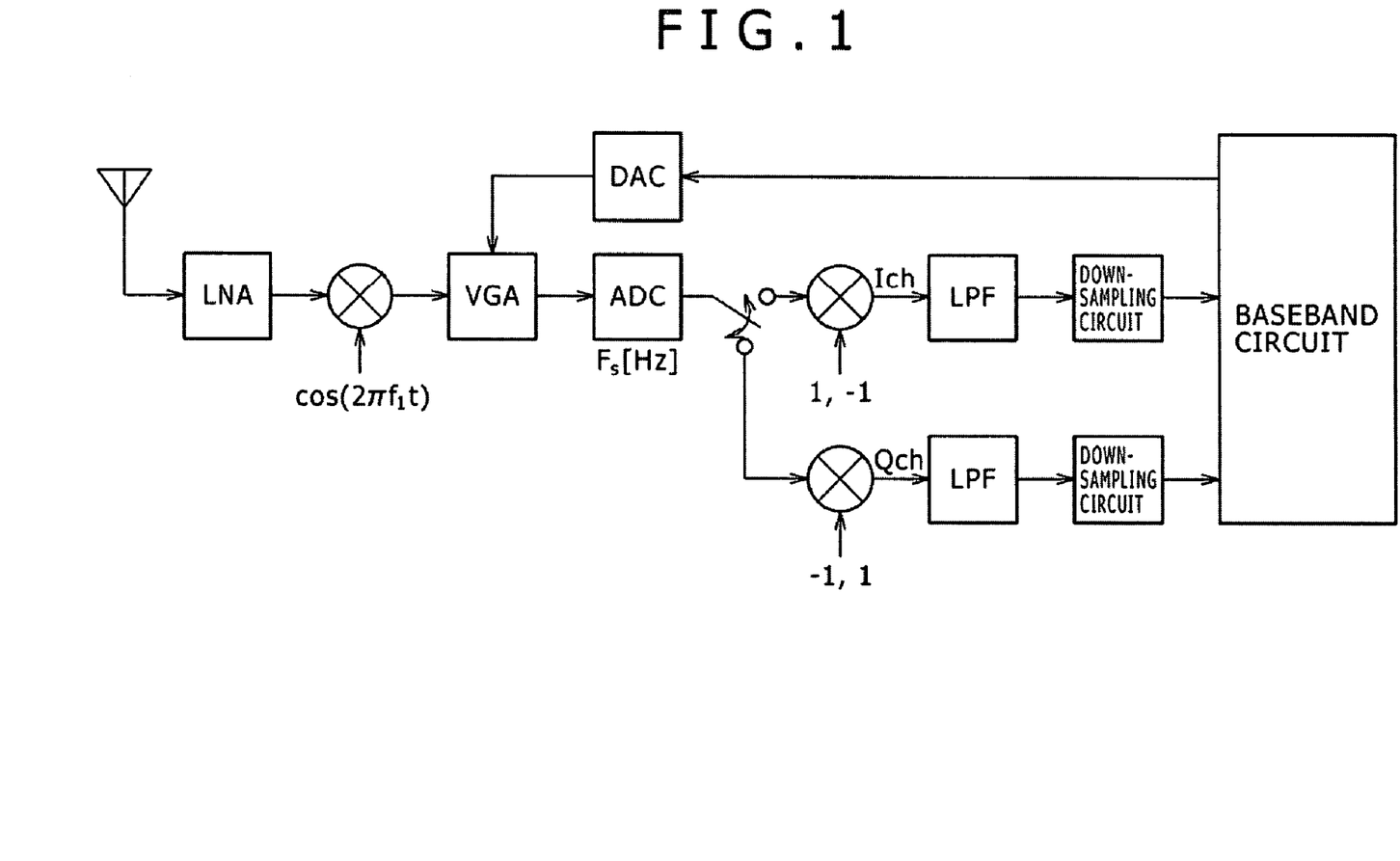
FIG. 1 is a diagram showing a configuration of a radio receiver according to an embodiment of the present invention.

The present invention further proposes a system for simplifying the configuration of a receiver using a relation such that a ratio of a band occupied by a baseband signal to a sampling frequency is 1 to N (N is an even number of two or more). FIG. 1 shows a configuration of a radio receiver according to an embodiment of the present invention.

The radio receiver is the same as in FIG. 8 in that an RF signal received by an antenna is amplified by an LNA and then converted into an IF band by a frequency conversion by a first frequency converter (frequency $f_1$), and next the IF signal is amplified by a VGA and converted into a digital signal by an AD conversion at a sampling frequency $F_s$ by an AD converter. Further, a second frequency converter in a subsequent stage multiplies the received signal r(t) after the AD conversion by frequency conversion coefficients shown in FIG. 7. Thereby, down-conversion equivalent to the multiplication of the received signal r(t) by a cosine and a sine with a frequency $f_2$ is realized, and baseband signals are obtained. Further, waveform shaping is performed by subjecting the baseband signals to an LPF operation, and the baseband signals are down-sampled by down-sampling circuits.

Figure 2:
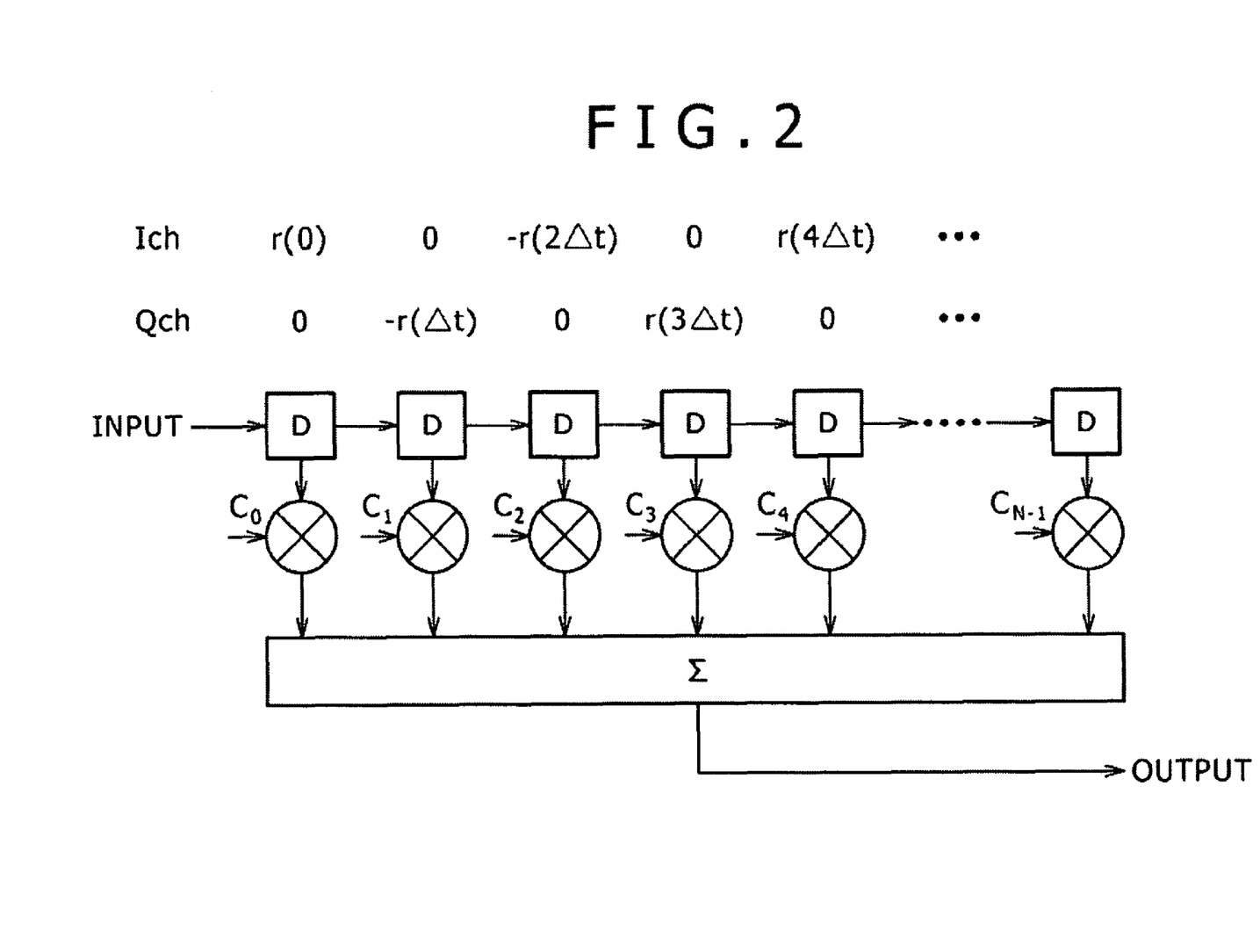
FIG. 2 is a diagram showing a relation between the configuration of LPFs and signals input to the LPFs in the radio receiver shown in FIG. 1.

In FIG. 1, a ratio of the band occupied by the baseband signals to the sampling frequency is 1 to 2 (that is, N=2). FIG. 2 shows a relation between the configuration of the LPFs in this case and the signals input to the LPFs. However, time is treated as discrete times $\Delta t \times n$ (n=0, 1, 2, ..., a). As is understood from FIG. 2, the received signals $I_0(t)$ and $Q_0(t)$ down-converted into a baseband alternately include zero in every other sample. It is thus considered that not all coefficients are required in the LPF operation.

Accordingly, directing attention to the alternate insertion of zero in the output signals $I_0(t)$ and $Q_0(t)$ after the frequency conversion, the receiver shown in FIG. 1 reduces an amount of operation by omitting operation for filter coefficients to which zero is input. A procedure of signal processing in the receiver will be described below.

(1) First, each sample of a signal after the AD conversion by the AD converter is alternately allocated to an I-channel and a Q-channel.

(2) Next, in each of the I-channel and the Q-channel, each sample of the allocated samples is multiplied by a coefficient of 1 (as it is) or −1 (sign conversion).

(3) Then, as filter processing after the multiplication of the coefficients, that is, after the down-conversion, the respective baseband signals of the I-channel and the Q-channel are subjected to a filtering process using respective filters having coefficients of an even-number component and an odd-number component of the LPF.

Figure 3A:
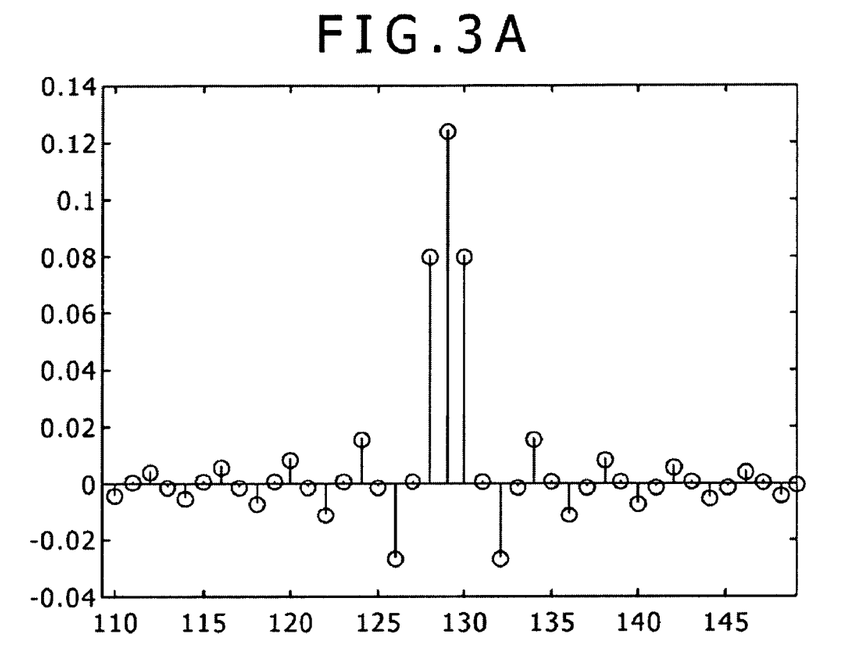
FIG. 3A is a diagram showing all coefficients of an ordinary LPF.
Figure 3B:
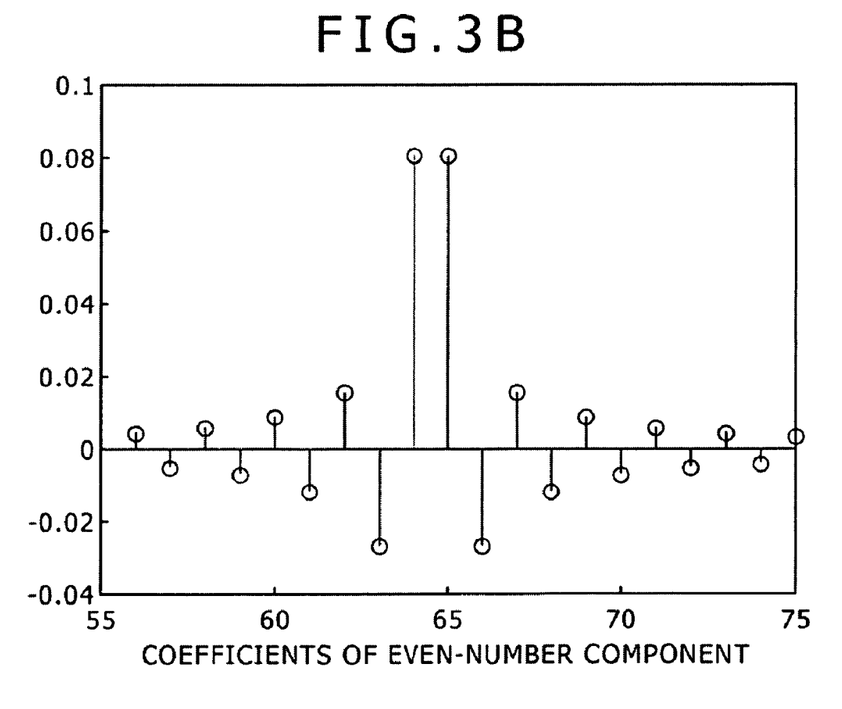
FIG. 3B is a diagram showing even-number coefficients of the ordinary LPF.
Figure 3C:
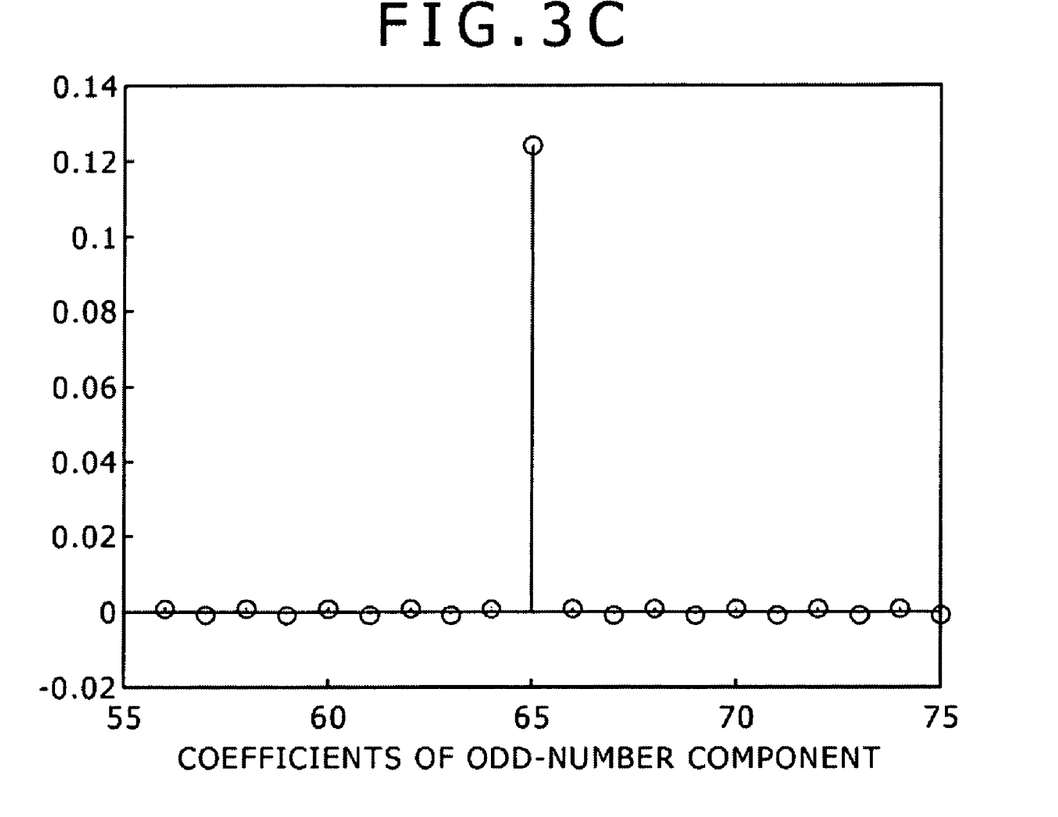
FIG. 3C is a diagram showing odd-number coefficients of the ordinary LPF.
Figure 4A:
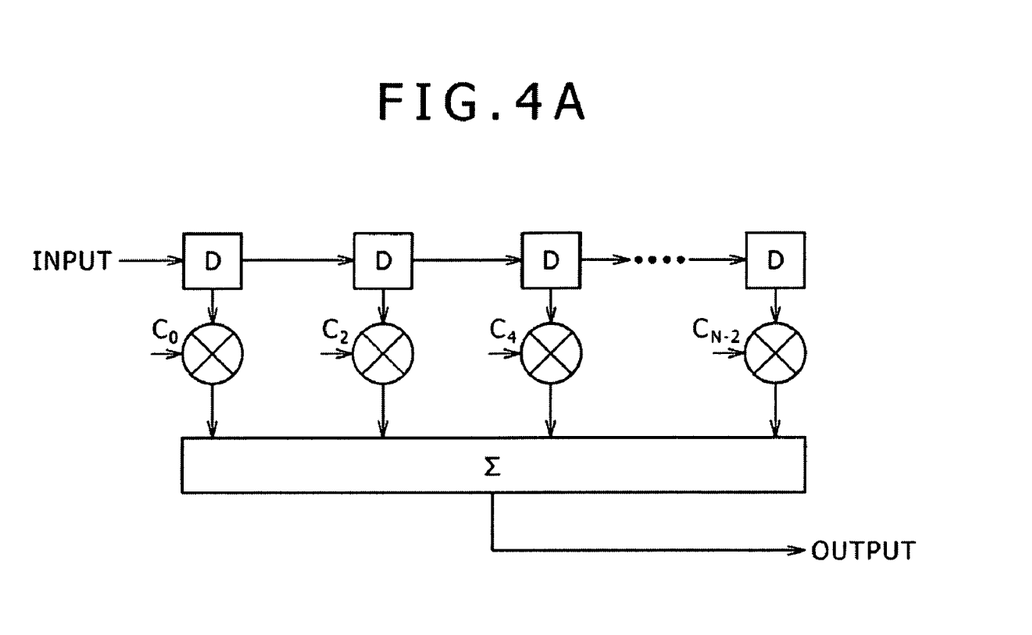
FIG. 4A is a diagram showing an LPF configuration for implementing a filtering process with the even-number coefficients of the LPF.
Figure 4B:
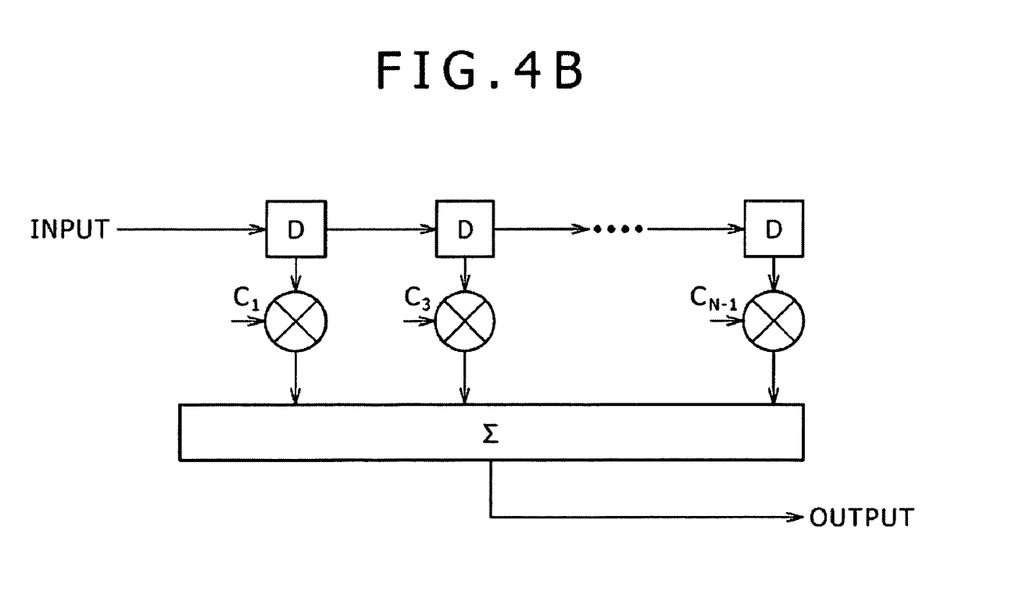
FIG. 4B is a diagram showing an LPF configuration for implementing a filtering process with the odd-number coefficients of the LPF.

FIGS. 3A to 3C respectively show all coefficients of an ordinary LPF, even-number coefficients of the LPF, and odd-number coefficients of the LPF. FIGS. 4A and 4B respectively show LPF configurations realizing the filtering process using the even-number coefficients of the LPF and the odd-number coefficients of the LPF. Because the filter coefficients are divided into the even-number coefficients and the odd-number coefficients, the circuit scale of the LPF configurations is halved as compared with the LPF configuration shown in FIG. 10.

(4) Then, the down-sampling circuits perform down-sampling (sample discrete reduction) by a number N' (=N/2). For example, when N=6, N'=3, and the down-sampling circuits perform a down-sampling process that uses one sample among three samples.

Figure 5:
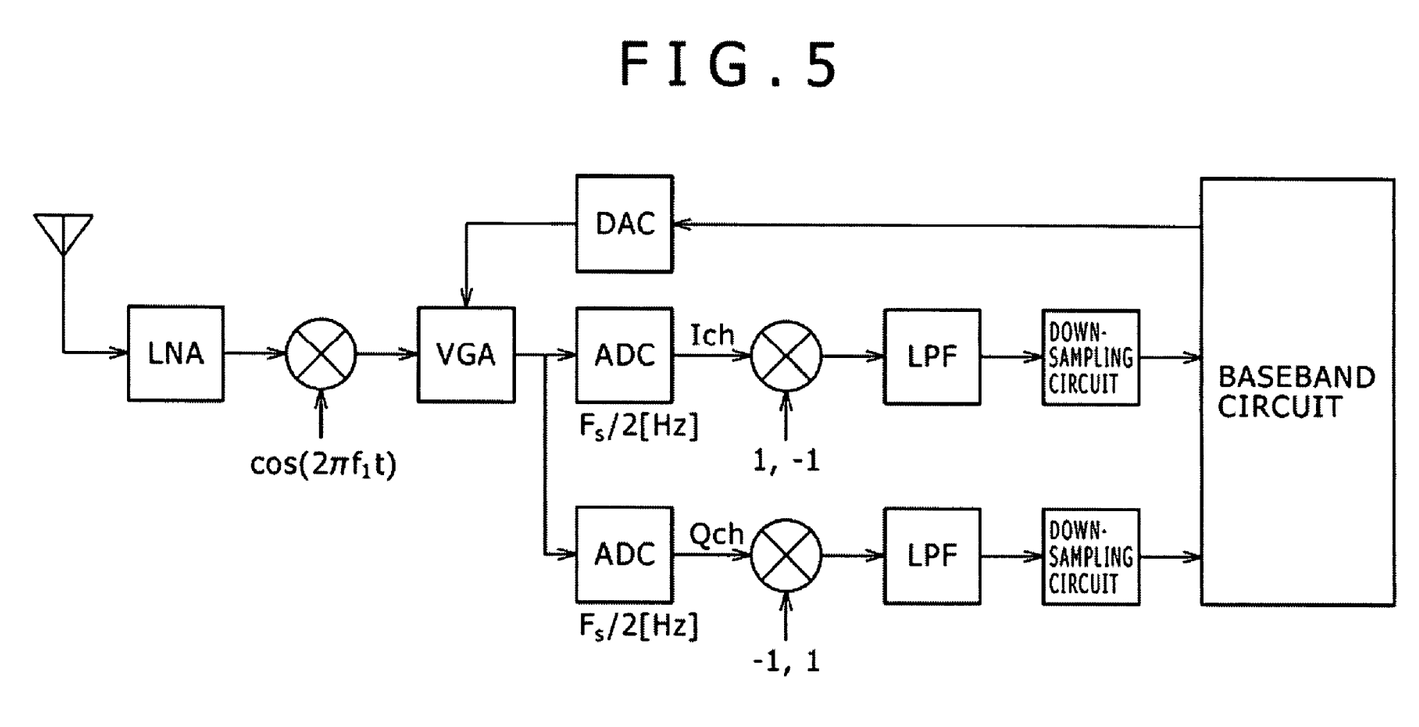
FIG. 5 is a diagram showing an example of configuration of a radio receiver including two AD converters that operate at an operating frequency of $F_s/2$ and in opposite phase from each other.

The digital radio receiver may also generate each of the digital signal of the I-channel and the digital signal of the Q-channel from the received signal by sampling using two AD converters that operate at an operating frequency of $F_s/2$ and in opposite phase from each other. FIG. 5 shows an example of configuration of a receiver further simplified by using such an AD conversion system.

In this case, while the number of AD converters included in the device is increased, the operating frequency of the AD converters is halved. Hence, the configuration is very effective in a system of an increased rate from a viewpoint of easing specifications imposed on the AD converters.

The present invention has been explained above in detail with reference to specific embodiments thereof. It is obvious, however, that modifications and substitutions in the embodiments may be made by those skilled in the art without departing from the spirit of the present invention.

The present invention is applicable to various digital radio communication technologies ranging from high-capacity basic trunk lines of terrestrial broadcasting, terrestrial microwave communications, satellite communications, satellite broadcasting and the like to access lines of mobile communications and the like.

In short, the present invention has been disclosed in a form that is illustrative and contents described in the present specification are not to be construed in a restrictive manner. In order to determine the spirit of the present invention, claims are to be considered.

It should be understood by those skilled in the art that various modifications, combinations, sub-combinations and alterations may occur depending on designs and other factors insofar as they are within the scope of the appended claims or the equivalents thereof.

What is claimed is:

1. A radio communication device configured to perform baseband processing by subjecting a received signal to an analog to digital (AD) conversion at a predetermined sampling frequency and converting a digital signal resulting from the AD conversion into a baseband signal by frequency conversion, said radio communication device comprising:
   a signal allocating unit configured to allocate signals to an I-channel and a Q-channel;
   a frequency converting unit configured to convert the digital signal resulting from the AD conversion into a complex baseband signal at a frequency $f_2$ having a relation such that a ratio of the sampling frequency $F_s$ at a time of the AD conversion to the frequency $f_2$ is one of a ratio of 4 to 1 and a ratio of 4 to 3, by sequentially multiplying each sample of the allocated samples by coefficients of 1 and −1 in each of the I-channels and the Q-channels;
   a waveform shaping unit configured to subject the baseband signal to waveform shaping; and
   a down-sampling unit configured to subject the baseband signal to sample discrete reduction taking one sample in N/2 samples, using a relation such that a ratio of a band occupied by the baseband signal to the sampling frequency $F_s$ is 1 to N, where N is an even number of two or more.

2. The radio communication device according to claim 1, wherein said waveform shaping unit subjects the baseband signal in the I-channel to a filtering process using a filter including coefficients of an even-number component of an LPF, and subjects the baseband signal in the Q-channel to a filtering process using a filter including coefficients of an odd-number component of the LPF.

3. The radio communication device according to claim 1, wherein a digital signal in an I-channel is generated from the received signal by sampling using an AD converter corresponding to the I-channel, and a digital signal in a Q-channel is generated from the received signal by sampling using an AD converter corresponding to the Q-channel, the two AD converters operating at an operating frequency of $F_{s/2}$ and in opposite phase from each other.

4. A radio communication device configured to perform baseband processing by subjecting a received signal to an AD conversion at a predetermined sampling frequency and converting a digital signal resulting from the AD conversion into a baseband signal by frequency conversion, said radio communication device comprising:
   a signal allocating unit configured to allocate signals to an I-channel and a Q-channel;
   a frequency converting unit configured to convert the digital signal resulting from the AD conversion into a complex baseband signal, at a frequency $f_2$ having a relation such that a ratio of the sampling frequency $F_s$ at a time of the AD conversion to the frequency $f_2$ is one of a ratio of 4 to 1 and a ratio of 4 to 3, by sequentially multiplying each sample of the allocated samples by coefficients of 1 and −1 in each of the I-channel and the Q-channel;
   a waveform shaping unit configured to subject the baseband signal to waveform shaping; and
   a down-sampling unit configured to subject the baseband signal to sample discrete reduction taking one sample in N/2 samples, using a relation such that a ratio of a band occupied by the baseband signal to the sampling frequency $F_s$ is 1 to N, where N is an even number of two or more.

* * * * *